United States Patent

[11] 3,612,087

[72] Inventor Jurion Roland
  Richwiller, France
[21] Appl. No. 867,217
[22] Filed Oct. 17, 1969
[45] Patented Oct. 12, 1971
[73] Assignee Mines de Potasse d'Alsace S. A.
  Mulhouse, France
[32] Priority Oct. 17, 1963
[33] France
[31] 170259

[54] WATER TREATING DEVICE
  4 Claims, 1 Drawing Fig.
[52] U.S. Cl. ................................................. 137/93,
  137/101.11, 137/205.5, 137/624.11
[51] Int. Cl. ......................................... G05d 11/02
[50] Field of Search ............................. 137/101.11,
  93, 5, 88, 205.5, 268, 604, 624.11, 624.3, 624.15

[56] References Cited
UNITED STATES PATENTS
2,260,936 10/1941 Everson .................. 137/604 X
2,680,715 6/1954 Cook ...................... 137/101.11 X
3,095,121 6/1963 Douty ...................... 137/93 X Primary Examiner—Alan Cohan
Attorney—I. William Millen ABSTRACT: A device for treating water by controlled injection of bromine. A bromine storage vessel communicates with a dilution vessel-suction pump which continuously circulates water to be treated therethrough to maintain a negative pressure in the storage vessel. Dosing means communicates with the vessel to intermittently transmit predetermined amounts of brominated water to the dilution vessel.

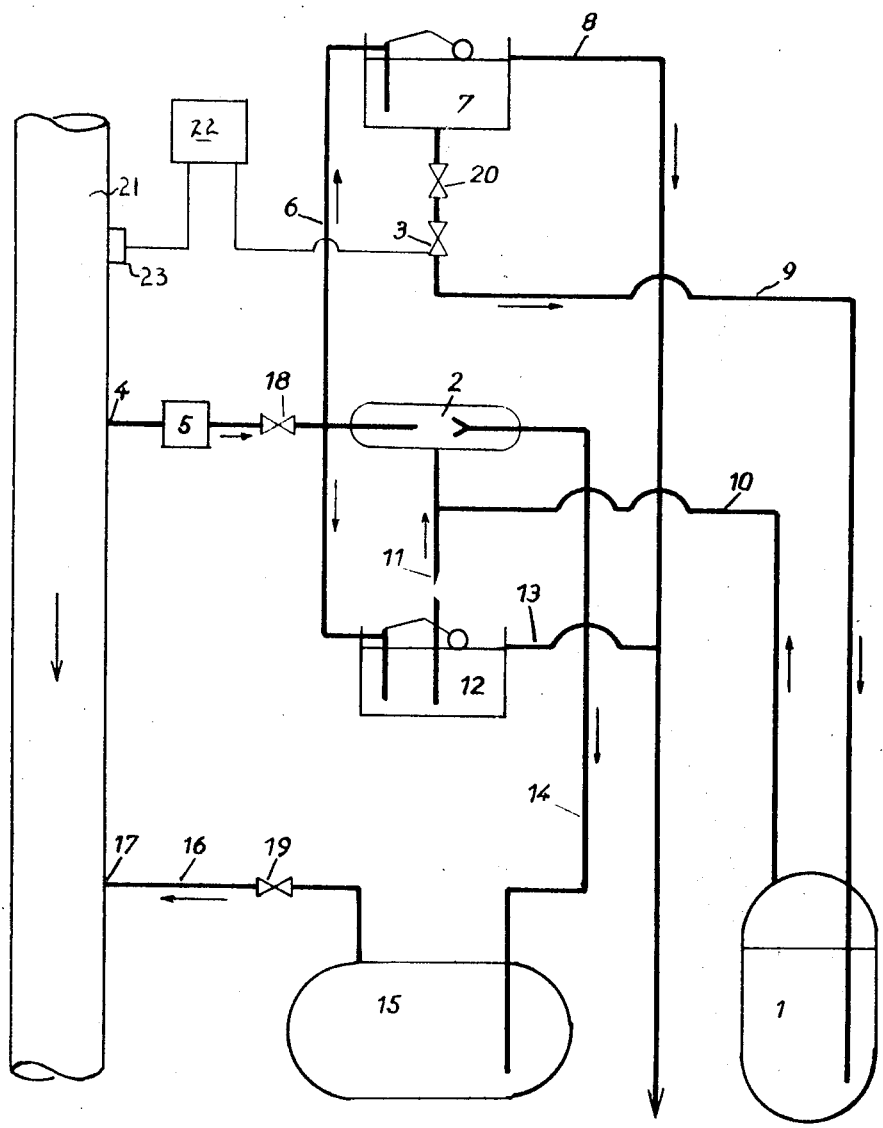
JURION ROLAND
INVENTOR

WATER TREATING DEVICE

BACKGROUND OF THE INVENTION

This invention relates to a device for treating water with an antiseptic compound and more particularly it is related to a device for the regulated introduction of an antiseptic compound into the water to be treated.

The new device according to the invention finds utility in any case wherein a predetermined and substantially constant content of an antiseptic agent should be maintained, the antiseptic agent being introduced as a solution, more particularly as an aqueous solution and specifically as a highly dilute solution. As an example, this device may be used for introducing an antiseptic compound into swimming pools, sanitizing water circuits, refrigerating circuits and so on.

Among the antiseptic agents which can be used with the new device of the invention, there can be mentioned as examples elementary halogens (chlorine, bromine, iodine), inorganic or organic chemical compounds such as hypochlorites, chlorites, halogenated hydantoins, halogenated cyanuric acids and so on.

The following description will be related more particularly to the use of bromine as antiseptic agent since the use of this product is most troublesome but it must be understood that the word "bromine" is used in view of simplification and that the device of the invention can be used for any other antiseptic compound to be introduced in controlled amount in a water circuit.

It is known that in an alkaline medium, such as swimming pool water, bromine has a high bactericidal power. Furthermore water treated by bromine has no unpleasant odor and does not irritate the mucous membrane.

The controlled use of liquid bromine as an antiseptic agent requires special operating precautions since bromine is a heavy liquid which is difficult to mix with water and dissolves relatively slowly. Direct injection of bromine into water therefore does not allow a precise control and survey of the content of bromine in the water to be treated. It is thus necessary to prepare an aqueous solution of bromine beforehand and to store the solution out of contact with the atmosphere, which presents serious problems.

In order to obviate the problems presented by the storage of aqueous bromine solutions, applicant has heretofore disclosed a device which allows an aqueous solution of bromine to be prepared, according to requirements, the solution being sufficiently dilute to be introduced directly into water. This device comprises at least one storage vessel for liquid bromine and a dilution vessel, the circulation of dilution water and of brominated water being controlled by at least two valves, one of which controls the introduction of water into the storage vessel and of brominated water into the dilution vessel while the other controls the introduction of water into the dilution vessel and the injection of highly diluted bromine solution into the water to be treated.

Applicant has also improved such device with respect to the fluid circulation control. According to this improvement, one of the two valves functions as a pressure regulator for the introduction of water into the dilution vessel and the injection of a highly diluted bromine solution into the water to be treated and the other valve is used to introduce water into the storage vessel and brominated water into the dilution vessel.

In both these devices and in the following description, "brominated water" is intended to mean an aqueous solution containing for example 10–30 grams per liter of bromine and "highly diluted bromine solution" is intended to mean an aqueous solution containing less than 100 milligrams per liter of bromine.

These devices, although permitting close control and a precise regulation of the quantity of bromine introduced into the water to be treated, still present some drawbacks. As an example it is necessary to use storage vessels which can resist relatively high pressures. Due to the high corrosive action of bromine, glass vessels are generally used for this purpose. Such vessels are, however, fragile and it is therefore necessary to use and handle them with special care. For example applicant has heretofore disclosed bottles comprising an outer protective shell and an inner container of glass, the space between the shell and the container being filled with an absorbing material, such vessels being easily put in service or out of use when they are empty. The seals generally used for the closure of such vessels are poorly resistant to relatively high pressures and there is therefore a risk of bromine vapors leaking through the seals.

SUMMARY OF THE INVENTION

This invention relates to a novel device for the controlled injection of an antiseptic agent into water to be treated which allows the use of relatively low pressure bromine storage vessels by providing a negative pressure feed system from the vessel. The device thereby allows the use of storage vessels made of material less fragile than glass. In particular vessels made out of synthetic plastic material having a good resistance to the antiseptic chosen can be used. This results in a noticeable simplification in the handling of the vessels and substantially sets aside any risk of breakage and emission of noxious bromine vapors.

In a preferred embodiment, the new bromine injection device for the treatment of water comprises at least one storage vessel for liquid bromine and a dilution vessel with one valve controlling the feed of water into the storage vessel and the introduction of brominated water into the dilution vessel, the device being characterized by the fact that the dilution vessel operates as a suction system in order to maintain a slight negative pressure in the storage vessel.

The dilution vessel preferably includes a jet pump in which there is a constant circulation of the water to be treated, the vacuum thus produced maintaining the bromine storage vessel constantly under a slight negative pressure, such negative pressure being, for example, equal to a few centimeters of mercury.

The valve used to regulate the feed of water into the storage vessel and the introduction of brominated water into the dilution vessel is preferably an electrically actuated solenoid valve which can be opened and closed according to a predetermined program. In this case the regulation of the programming system which controls the valve can be accomplished by a manual system, according to the requirements of the water to be treated or an electric system of the time switcher type when the variations in the content of antiseptic agent are known in advance can be used.

According to another embodiment of the invention, a continuous measurement of the bromine content in the water to be treated is provided for and the measured value is used to signal an electromechanical or electronic device to actuate the solenoid valve. This system is preferably used when the bromine content of a fluctuating water circuit should be maintained at a constant level, as is the case with a swimming pool when the attendance cannot be predetermined.

The accompanying drawing shows, as an example, one particular embodiment of the new bromine injection device.

A bromine storage vessel 1 communicates with a dilution vessel 2 through a conduit 10. The water to be treated circulates through a conduit 21 in the direction indicated by the arrow. A portion of the water is taken off at 4 and conducted by way of a pump 5 to the dilution vessel 2. Conduit 6 directs a portion of the water from pump 5 to a controlled level reservoir 7 which is provided with an overflow 8. A conduit 9, controlled by a valve 3, provides communication between the reservoir 7 and the storage vessel 1. By actuating the valve 3, a predetermined amount of water can be sent to the storage vessel 1 and an equivalent amount of brominated water is thereby sent to the dilution vessel 2 through the conduit 10.

The water height in the reservoir 7 is selected such that the pressure head developed thereby is such that in the event of failure of the system pump, the pressure buildup in the vessel will not be sufficient to force bromine to escape from the vessel.

A conduit 11 is branched from the conduit 10 and communicates with a second controlled level reservoir 12, which is furnished with an overflow 13. The dilution vessel 2 is provided with an outlet conduit 14 arranged in spaced, coaxial relation with respect to the inlet from the pump 5 such that a "jet pump" effect is provided proximate the inlet point from the conduits 10 and 11 and a negative pressure corresponding to the pressure head in the conduit 11 is continuously maintained on the storage vessel 1. Obviously other types of pumps, such as a positive displacement pump or the like, may be substituted for the device specifically described without exceeding the scope of the invention. The negative pressure in the vessel 1 may thereby be regulated by varying the level of water maintained in the reservoir 12 and thereby the pressure head in the conduit 11.

The conduit 14 communicates with a buffer tank 15 which, in turn, communicates through a conduit 16 with the conduit 21 at 17. The tank 15, although not absolutely required in the operation of the invention, is preferred since operation is improved thereby by the damping out of fluctuations of bromine concentration in the brominated water reintroduced into the circuit.

Valves 18 and 19 are disposed in the conduits upstream of the dilution vessel 2 and downstream of the buffer tank 15 to isolate the injection device from the water circuit when maintenance or other needs so require. Since the valves are only used intermittently, they are preferably of the manual type.

A valve 20 is disposed in the conduit downstream of the reservoir 7 and upstream of the valve 3. The valve, preferably of the manually adjusted type, is useful in varying the flow capacity in the conduit 9 to compensate for the progressive decrease of the bromine level in the storage vessel 1 and the attendant decrease of bromine concentration in the solution issuing from the vessel.

The valve 3, preferably of the electrically actuated solenoid type, is connected to an actuator 22 which, in turn, may be connected to a sensor 23 in the conduit 21. The actuator 22 may be a time operated device which energizes the valve 3 at predetermined time intervals and/or is responsive to bromine concentration in the system water as sensed by the sensor 23. The sensor 23 may be of any type known in the art such as those disclosed in applicant's copending applications as described in greater detail below.

When the bromine injection device is connected with the circuit water to be treated in the conduit 21 and when the valve 3 is closed, water flows through the dilution vessel 2 and returns to the conduit 21 through the conduit 14, buffer tank 15 and conduit 16. When valve 3 is opened, a predetermined amount of brominated water flows into vessel 2 where it is again diluted before being injected into the circuit as a highly diluted bromine solution.

Regarding the storage of the antiseptic agent used, the new device according to the invention further allows the use of vessels made of a synthetic plastic material resistant to corrosion by the antiseptic agent such, for example, as polyethylene, polypropylene, tetrafluoroethylene and so on. These vessels can have a small or large capacity, according to the consumption of antiseptic agent which is anticipated. It is also possible to incorporate several vessels which can be used either in series or in sequence. In the latter case the vessels can, for example, be placed on a rotating tray with one of the vessels in service, the following vessel or vessels constituting a reserve which can rapidly be substituted to the initial vessel when it becomes empty. Although synthetic plastic materials are preferably used for the storage vessels, it is of course understood that any material which resists corrosion by the antiseptic agent can be used. Glass or a metal with an internal protective coating of enamel are thus appropriate materials. When glass is used, the invention makes it possible to use vessels having a larger capacity than heretofore possible, without risk of breakage due to high pressures. Moreover the negative pressure which is maintained in the vessel eliminates, in case of leakage, the emission of bromine vapors into the atmosphere.

The invention will now be described, as an example of a particular application, as applied to the treatment of swimming pool water.

A swimming pool installation generally comprises a pool with a recycle circuit on which is located a filter, the circulation of water in this circuit being performed by at least one pump. A bromine injection device, according to the invention, is connected to this circuit at a point in the recycle circuit such for example, as conduit 21.

The antiseptic content of a swimming pool varies, obviously, as a function of the number of bathers and, therefore, in order to insure best hygienical conditions, it is necessary in this case to operate a continuous measurement of the residual bromine content of the treated water circuit and to correlate the injection of bromine to the value thus determined. Such continuous measurement can be accomplished through the sensor 23 which, as an example, can constitute a cell comprising a pile which delivers a current, the value of which is proportional to the quantity of bromine present in the water to be treated. In copending application, Ser. No. 709,748, filed Mar. 1, 1968, applicant discloses a particular type of cell which can be used successfully in such conditions. Such a cell comprises a platinum electrode immersed in the bromine solution to be analyzed and a reference electrode constituted by a silver wire immersed in a saturated and gelified solution of sodium chloride. The solution to be analyzed receives potassium iodide and a buffer solution. In this cell, bromine displaces iodine from the potassium iodide, the liberated iodine being reduced on the platinum electrode. The level of the delivered current is thus proportional to the bromine content.

Another type of cell suitable for the continuous measurement of the bromine content, comprises a platinum electrode and a silver electrode, both immersed in the water to be analyzed and between which there is maintained a constant voltage difference. The level of the delivered current is, in this instance, directly proportional to the bromine content of the water which flows through the cell.

The current delivered by the sensor 23, after having optionally been amplified, is sent to the actuator 22 which can comprise a galvanometer. This galvanometer indicates the bromine content of the treated water and, furthermore, acts on valve 3 through an electronic or electromechanical device of the cyclic dosimeter type. Such cyclic dosimeter can comprise a plurality of operating positions corresponding to the periods where the residual bromine content of the water to be treated is lower than, equal to or higher than a reference value corresponding to a normal average attendance of the swimming pool. According to the position of the dosimeter, valve 3 will be respectively opened for a relatively long time at short intervals, opened for a relatively short time at long intervals or closed.

What has been set forth is intended as exemplary to enable those skilled in the art in the practice of the invention and it should therefore be understood that, within the scope of the appended claims, the invention may be practiced other than as specifically described.

What is claimed is:

1. In a bromine injection device for treating water flowing through a recycle circuit by diverting a portion of the water to be treated through said device, the improvement comprising:
  pump means having at least one inlet conduit and an outlet conduit thereto and power means for continuously transmitting fluid between said inlet and outlet conduits to generate a negative pressure area therebetween;
  feed means communicative with said inlet conduit for continuously supplying water to be treated to said pump means;
  conduit means communicating a bromine storage vessel with said negative pressure area for intermittently supplying brominated water to said pump means;

a first controlled level reservoir communicative through a valve means with said storage vessel for supplying water thereto at controlled intervals to displace an equivalent amount of brominated water from said vessel toward said pump means, the pressure head developed by said first reservoir being less than that required to displace said brominated water into said pump means; and a second controlled level reservoir communicative with said conduit means to generate, through said pump means, a substantially constant negative pressure on said storage vessel as determined by the liquid level therein.

2. A device in accordance with claim 1 wherein said pump means comprises a chamber defining a dilution vessel and wherein said inlet conduit is disposed in spaced, coaxial relationship to said outlet conduit said conduit means being disposed substantially normal to said inlet and outlet conduits and proximate said negative pressure area.

3. A device in accordance with claim 1 wherein actuating means including a timer are connected to said valve for opening thereof at predetermined time intervals.

4. A device in accordance with claim 1 wherein actuating means including a bromine level sensor communicative with the water to be treated are connected to said valve for opening thereof on predetermined dilution of bromine in said water to be treated.

UNITED STATES PATENT OFFICE
CERTIFICATE OF CORRECTION

Patent No. 3,612,087    Dated October 12, 1971

Inventor(s) Jurion Roland

It is certified that error appears in the above-identified patent and that said Letters Patent are hereby corrected as shown below:

Cover page, line 8: change "[32] Priority Oct. 17, 1963" to correctly read -- [32] Priority Oct. 17, 1968 --

Signed and sealed this 11th day of April 1972.

(SEAL)
Attest:

EDWARD M. FLETCHER, JR.
Attesting Officer

ROBERT GOTTSCHALK
Commissioner of Patents